A. J. HARTLEY.
FRICTION BRAKE MECHANISM.
APPLICATION FILED FEB. 7, 1919.
1,322,304.
Patented Nov. 18, 1919.
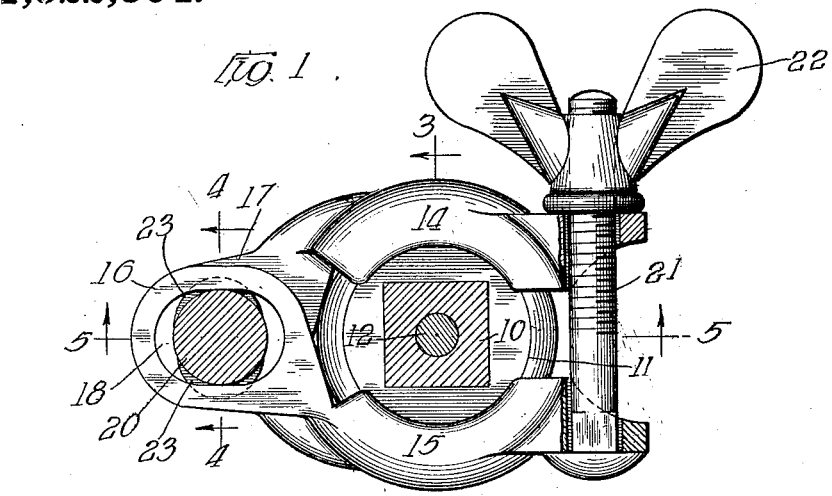
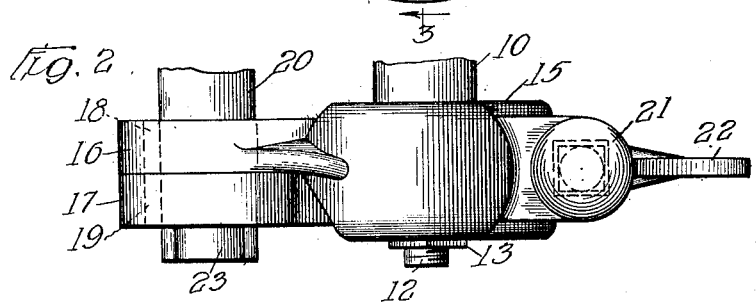
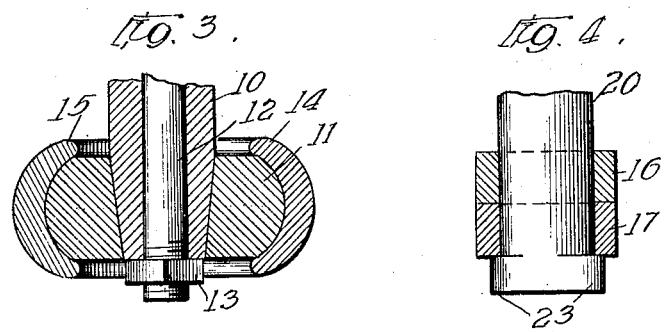
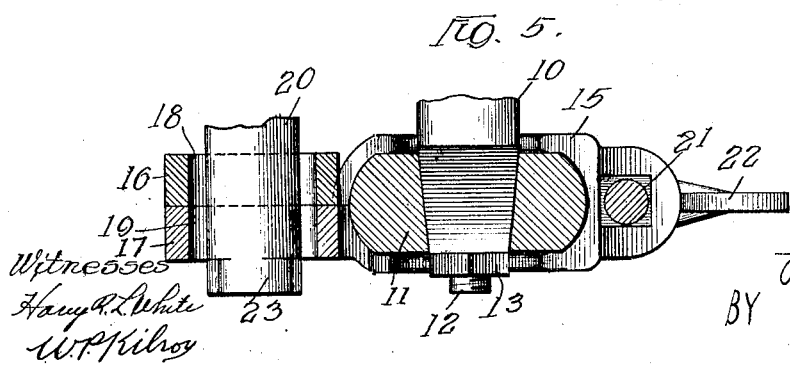
Witnesses
Harry A. L. White
W. P. Kilroy
Inventor
Arthur J. Hartley
BY
W. V. Liff
Atty.

UNITED STATES PATENT OFFICE.

ARTHUR J. HARTLEY, OF PEORIA, ILLINOIS.

FRICTION-BRAKE MECHANISM.

1,322,304.  Specification of Letters Patent.  Patented Nov. 18, 1919.

Application filed February 7, 1919. Serial No. 275,531.

*To all whom it may concern:*

Be it known that I, ARTHUR J. HARTLEY, a citizen of the United States of America, residing at Peoria, in the county of Peoria and State of Illinois, have invented certain new and useful Improvements in Friction-Brake Mechanism, of which the following is a specification.

My invention relates to friction brake mechanism.

My invention has special reference to friction brake mechanism adapted to be applied to a cross or swinging conveyer, such as is used in connection with grain weighers, as they are applied to threshing machines.

The object of my invention is to establish a normal brake action in connection with a pivoted spindle support for a swinging conveyer that in its action in conjunction with such spindle will permit the swinging conveyer to be pushed from one position to another by the application of the hand, but will be held at such different positions of swinging when manual force is withdrawn.

My invention includes a spindle support for a cross or swinging conveyer, a brake member fixed thereto and sectional friction members coöperating with said brake member on said spindle, said sectional brake members being related to a pivoting pin, or centering member, in a manner to permit both lateral and longitudinal relative shifting of said sectional members.

My invention also includes relative fashioning of friction members to accommodate substantially universal assembling in working relation, without modification, by machining, milling or grinding, and to promote taking up lost motion as a result of wear, by relative tightening of the friction member parts.

My invention also includes means for regulating the tension of friction members.

Referring to the drawings—

Figure 1 is a plan view of my improved friction brake, showing its manner of application to a spindle;

Fig. 2 is a side elevation of the same subject matter as disclosed in Fig. 1;

Fig. 3 is a detailed vertical section through a spindle part, and a friction member fixed thereon;

Fig. 4 is a detailed view, partly in section, indicating the manner of relating friction members to a centering or pin member.

Fig. 5 is a sectional view on the line 5—5 of Fig. 1.

I am aware of the fact that friction bands have been heretofore applied to spindles in various working relations, and in various arts, and also that a friction band has been applied in connection with supporting spindles for cross or swinging conveyers, but in such instances of use, or practical application of such friction brakes, I have found them defective for various reasons, including the fact that such friction brakes are only successful when finished and machined, and then only in limited applications. The cost and expense of such friction brake mechanism are now wholly out of the question, in view of the limited profits that are available through the sale of cross or swinging conveyers.

My thought has been directed to the production of a friction brake that may be applied as it comes from the mold, without modification, and not requiring grinding or machining, and to this end I have developed the present invention.

Referring to the drawings, 10 is a spindle, which serves, when related to a swinging conveyer, as a support for the latter, and constitutes its center for turning. 11 is a brake member upon spindle 10. 12 is a bolt serving in connection with nut 13 to secure brake member 11 to spindle 10. Brake member 11 is formed with an arcuate shaped friction face, as shown, for purposes hereinafter described.

14 and 15 are brake members adapted to be associated relatively and in relation to brake member 10, to engage the surface of the latter, to promote brake action. Brake members 14 and 15 are each provided with braking or friction faces, arcuate shaped in cross section, approximating the conformation of braking face of brake member 11, except that in the latter, sufficient clearance is provided that will accommodate the maintenance of relative seating or friction relation. As wear may result from friction of the related parts, the sectional members may be spaced relatively to compensate for lost motion. Sectional members 14 and 15 of the brake are elongated as at 16, 17, relatively, and each is provided with an elongated opening, as 18, 19, adapting the same to be centered upon a pin member, as 20, said pin spacing laterally the width of said openings, considerable clearance being provided between the front and rear walls of said openings, whereby relative longitudinal shifting of sections may occur under circumstances of inequalities in the surface either of brake member 11, or brake members 14 and 15, whereby natural seating of the related parts is effected, without modifying by grinding or milling, said parts.

Perforated lug members are provided at the forward end of each of the brake sections 14 and 15, providing for the seating of a bolt member 21 therein, sufficient clearance being provided, however, in the seating of said bolt in connection with the openings in said lug members, to accommodate relative longitudinal shifting of brake members 14 and 15. 22 is a wing nut adapted to be applied to bolt 21, to properly space brake members 14 and 15 with relation to brake member 11.

Pin member 20 may be provided with laterally flanged members 23 of such width that will permit application to pin member 20, when parts are positioned relatively to permit such application, and when brake members 14 and 15 are turned into working position in conjunction with brake member 11. A support is provided for the rear end of the said members, whereas the forward or body portion of said brake members 14 and 15 is supported in connection with and upon brake member 11.

In applying the brake to practical use, members 14 and 15 are applied to pin 20 and caused to embrace and engage brake member 11, and establishing the proper brake relation between the parts by means of wing nut 22, the friction between the brake member parts may be decreased or increased, as may be desired. With this friction brake applied to spindle 10, the swinging or cross conveyer may be swung into any position desired, and will be properly held in such position.

Form and relative adjustability of the brake member parts herein shown are of the essence of my invention, and it is to these features that my claims are directed.

What I claim is:

1. A friction brake mechanism of the class described, comprising a rotatable spindle, a friction brake member mounted thereon, a plurality of cast metal coöperating friction brake members having unfinished friction faces adapted to engage the friction face of the rotatable friction brake member, each of said coöperating friction brake members being provided with extensions having elongated slots in registry with each other, and a centering pin extending through the registered slots of said extensions, said pin being relatively smaller than the longitudinal dimensions of the several slots, whereby the several coöperating friction brake members may be automatically shifted longitudinally relatively to each other and their unfinished friction faces may settle into positive engagement with said rotatable friction brake member.

2. A friction brake mechanism of the class described, comprising a rotatable spindle, a friction brake member mounted thereon, a pair of integral cast metal coöperating friction brake members positioned on the opposite sides of said rotatable friction brake member and having unfinished friction faces adapted to engage the friction face of the rotatable friction brake member, each of said coöperating friction brake members being provided with rearward extensions having elongated slots in registry with each other and with forward extensions formed with alined bolt holes, a centering pin extending through the registered slots of said rearward extensions, said pin being relatively smaller than the longitudinal dimension of the several slots, whereby the several coöperating friction brake members may be shifted longitudinally relatively to each other and their unfinished friction faces may settle into positive engagement with said rotatable friction brake member, a bolt loosely mounted in the holes of said forward extensions, and a nut threaded on one end of said bolt whereby the pressure of said coöperating friction brake members on the rotatable friction brake members may be regulated without interfering with the relative longitudinal movement of said coöperating friction brake members.

3. A friction brake mechanism of the class described, comprising a rotatable spindle, a friction brake member mounted thereon, a pair of integral coöperating friction brake members having unfinished friction faces adapted to engage the friction face of the rotatable friction brake member, said coöperating friction brake members being movable relatively to each other longitudinally of their friction-faces, whereby said coöperating members may settle into positive engagement with said rotatable brake member and compensate for inequalities in the friction faces, and means connecting said coöperating members for regulating the pressure of their friction faces upon the rotatable friction brake member, without interfering with their relative longitudinal movement, substantially as described.

4. A friction brake mechanism of the class described, comprising a rotatable spindle, a friction brake member having an arcuate friction face mounted on said spindle and adapted to rotate therewith, a plurality of coöperating friction brake members having arcuate friction faces adapted to engage the friction face of the rotatable friction brake member, each of said coöperating friction brake members being provided with extensions having elongated slots in registry with each other, and a centering pin extending through the registered slots of said extensions, said pin being relatively smaller than the longitudinal dimensions of the several slots, whereby the several coöperating friction brake members may be shifted longitudinally relatively to each other and their friction faces may move into positive engagement with said rotatable friction brake member.

In testimony whereof I have affixed my signature.

ARTHUR J. HARTLEY.